United States Patent
Foo et al.

(10) Patent No.: US 9,544,029 B2
(45) Date of Patent: *Jan. 10, 2017

(54) METHOD FOR ANTENNA ARRAY WITH STEERABLE SPOTLIGHT BEAMS

(71) Applicant: Huawei Technologies Co., Ltd., Shenzhen (CN)

(72) Inventors: Senglee Foo, Ottawa (CA); Wen Tong, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/171,639

(22) Filed: Jun. 2, 2016

(65) Prior Publication Data

US 2016/0277077 A1  Sep. 22, 2016

Related U.S. Application Data

(63) Continuation of application No. 14/584,201, filed on Dec. 29, 2014, now Pat. No. 9,398,468.

(51) Int. Cl.
*H04B 7/04* (2006.01)
*H01Q 3/24* (2006.01)
(Continued)

(52) U.S. Cl.
CPC ............ *H04B 7/0408* (2013.01); *H01Q 1/246* (2013.01); *H01Q 3/24* (2013.01); *H01Q 3/36* (2013.01);
(Continued)

(58) Field of Classification Search
CPC ....... H04B 7/0408; H04B 7/0413; H01Q 3/24; H01Q 21/061; H04W 84/042
See application file for complete search history.

(56) References Cited

U.S. PATENT DOCUMENTS 4,882,588 A * 11/1989 Renshaw .................. H01Q 3/22
 342/354
6,218,987 B1 * 4/2001 Derneryd ................ H01Q 1/246
 342/373

(Continued)

FOREIGN PATENT DOCUMENTS

CN 1346221 A 4/2002
CN 1604393 A 4/2005
(Continued)

*Primary Examiner* — Brandon Miller
(74) *Attorney, Agent, or Firm* — Slater Matsil, LLP

(57) ABSTRACT

Cellular array implementations with multiple steerable spotlight beams irradiated from a common aperture are disclosed herein. Such an approach can easily be adapted to suit various geographical population densities and distributions. The array is capable of producing multiple 65-degree cellular coverage beams, which may be used for regular coverage or in MIMO (Multiple Input Multiple Output) mode. The array may also produce multiple steerable beams, or "spotlight" beams. These beams may be relatively narrow and may be steered electronically both in azimuth and elevation directions. By steering the beams in this way, the beams are able to provide cellular services at high-demand "hotspot" regions where high capacity service is required. The spotlight beams may also be used to fill voids or deficiencies caused by regular coverage beams.

20 Claims, 6 Drawing Sheets

(51) Int. Cl.
  *H01Q 21/06* (2006.01)
  *H01Q 25/00* (2006.01)
  *H01Q 1/24* (2006.01)
  *H01Q 3/36* (2006.01)
  *H04W 16/28* (2009.01)
  *H04W 84/04* (2009.01)

(52) U.S. Cl.
  CPC ............ *H01Q 21/061* (2013.01); *H01Q 25/00* (2013.01); *H04B 7/0413* (2013.01); *H04W 16/28* (2013.01); *H01Q 21/062* (2013.01); *H01Q 21/065* (2013.01); *H04W 84/042* (2013.01)

(56) References Cited

U.S. PATENT DOCUMENTS

| | | | |
|---|---|---|---|
| 9,398,468 B1* | 7/2016 | Foo | H04W 16/28 |
| 2002/0039912 A1 | 4/2002 | Yamaguchi et al. | |
| 2002/0063657 A1* | 5/2002 | Shuch | H01Q 3/26 |
| | | | 342/362 |
| 2004/0160374 A1 | 8/2004 | Johansson et al. | |
| 2005/0003864 A1 | 1/2005 | Elliot et al. | |
| 2009/0189821 A1* | 7/2009 | Deng | H01Q 3/16 |
| | | | 343/758 |
| 2011/0134008 A1* | 6/2011 | Schadler | H01Q 9/0428 |
| | | | 343/833 |
| 2015/0236430 A1* | 8/2015 | Foo | H01Q 25/00 |
| | | | 342/368 |

FOREIGN PATENT DOCUMENTS

| | | |
|---|---|---|
| CN | 1748340 A | 3/2006 |
| WO | 9623329 A1 | 8/1996 |
| WO | 2006044579 A2 | 4/2006 |

\* cited by examiner

METHOD FOR ANTENNA ARRAY WITH STEERABLE SPOTLIGHT BEAMS

CROSS-REFERENCE TO RELATED APPLICATIONS

This application is a continuation of U.S. application Ser. No. 14/584,201, filed on Dec. 29, 2014, which application is hereby incorporated herein by reference.

TECHNICAL FIELD

The present invention generally relates to the field of antenna arrays. More specifically, the present invention is related to cellular array implementations with multiple steerable spotlight beams irradiated from a common aperture.

BACKGROUND

As wireless devices have exploded in popularity, the ability to provide sufficient coverage to more and more users over large areas is more crucial than ever. Current cellular antenna array techniques have reached limiting factors in meeting these demands. As such, there is a growing need to provide wireless coverage with higher capacity in certain regions.

Current standard cellular arrays produce a single azimuth beam with 65-degree or 90-degree beam-width for sectorized cellular coverage. In an urban area, there can exist several densely populated areas, or hot spots, where particularly high capacity of communications are required. In such cases, additional steerable beams with narrow azimuth beam-width can be used to improve capacity in these areas.

One conventional approach for producing several narrow azimuth beams involves use of a Butler matrix with a uniform weight function. However, this approach produces radiation patterns with relatively high sidelobes that waste energy and may cause interference with neighbouring beams. Other approaches use an additional antenna with a relatively large aperture on top of a typical cellular array to produce the narrow beams in a cellular network. This method is undesirable due to limited and expensive real estate on a cellular tower. Furthermore, the narrow beam produced in this manner is often not electronically steerable making this approach only useful in a scenario with fixed geographical density.

SUMMARY

An antenna array architecture is disclosed herein, including multiple rows of discrete radiators. Multiple discrete radiators at the interior of the rows are fed in pair to a first set of hybrid couplers. A first output of the first set of hybrid couplers is fed to a first azimuth phase shifter, and a second output of the first set of hybrid couplers is fed to a second azimuth phase shifter. Radiators at the ends of the rows fed in pair to a second set of hybrid couplers, where a first output of the second set of hybrid couplers at one end of the rows is fed to a first elevation phase shifter to produce a first beam, a first output of the second set of hybrid couplers at another end of the rows is fed to a second elevation phase shifter to produce a second beam, a second output of the second set of hybrid couplers is fed to a third set of hybrid couplers, a first output of the third set of hybrid couplers is fed to the first azimuth phase shifter, and a second output of the third set of hybrid couplers is fed to the second azimuth phase shifter. A third elevation phase shifter is configured to receive the output of the first azimuth phase shifter to produce a third beam, and a fourth elevation phase is configured to receive the output of the second azimuth phase shifter to produce a fourth beam, where the first beam and the second beams are coverage beams for providing service to a large area and the third and fourth beams are spotlight beams for providing high capacity service to a targeted area.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF ILLUSTRATIVE EMBODIMENTS

Figure 1:
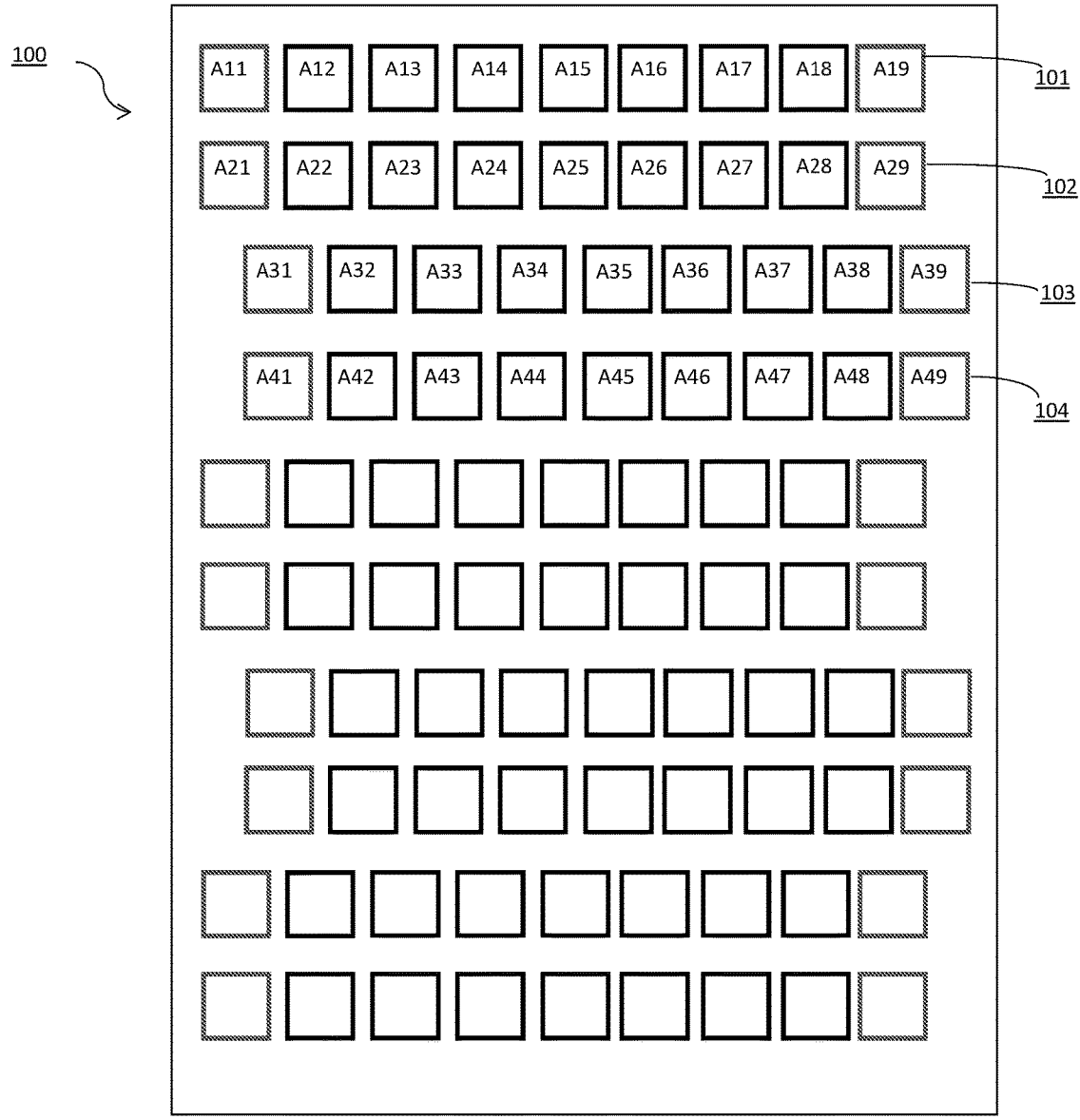
FIG. 1 is an exemplary array architecture of the cellular MIMO array with spotlight beams according to embodiments of the present disclosure.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Embodiments are well suited to performing various other steps or variations of the steps recited in the flowchart of the figures herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a cellular antenna array. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of an antenna array or other electronic computing device that manipulates and transforms data represented as physical (electronic) quantities within the system's registers and memories into other data similarly represented as physical quantities within the system memories or registers or other such information storage, transmission or display devices.

Cellular Array with Steerable Spotlight Beams

Cellular array implementations with multiple steerable spotlight beams irradiated from a common aperture are disclosed herein. Such an approach can easily be adapted to suit various geographical population densities and distributions.

According to some embodiments, the array is capable of producing multiple 65-degree cellular coverage beams, which may be used for regular cellular coverage with diversity gain or in MIMO (Multiple Input Multiple Output) mode. The array may also produce multiple relatively narrow steerable beams, or "spotlight" beams. The spotlight beams may be relatively narrow and may be steered (e.g., moved, aimed, or rotated) electronically both in azimuth and elevation directions. By steering the beams in this way, the array is able to provide higher capacity service with greater reliability at high-demand "hotspot" regions where high capacity service is required. The spotlight beams may also be used to fill voids or deficiencies caused by regular coverage beams, for example.

In this way, the cellular arrays of the various embodiments disclosed herein may significantly improve network capacity with MIMO capability for regular cellular services, and the arrays are complemented with multiple steerable beams. The steerable beams may be high-gain and relatively narrow spotlight beam. The antenna beams disclosed in the embodiments herein may be irradiated simultaneously and independently from a common aperture.

It should be noted that the combination of regular cellular beams and spotlight beams result in higher overall aperture efficiency. The various implementation of these array concepts utilizes an orthogonal dual beam former, which allows simultaneous beam forming of multiple coverage beams and spotlight beams using a common aperture. The orthogonal dual beam former allows relatively low-loss integration of regular cellular beams with multiple spotlight beams using simple radio frequency (RF) circuits, resulting in a higher overall aperture efficiency.

The array architecture disclosed herein may be used in a typical three-sector cellular network. The relatively narrow spotlight beams are electronically steerable both in azimuth and elevation directions, independent of the coverage beams. The array contains a plurality of driven radiating elements distributed on a planar aperture. An orthogonal dual beam former is used to allow the radiating elements to be fed simultaneously so that multiple cellular coverage beams and multiple electronically steerable spotlight beams may be produced at the same time from a common aperture.

With regard to FIG. 1, an exemplary multi-beam array architecture 100 is illustrated according to embodiments of the present invention. According to some embodiments, the array has 9 columns and 10 rows of discrete radiators. The radiators may be broadband radiators such as broadband patches or dipoles. Every two rows of radiators (e.g., pairs of rows) may be offset in the azimuth direction by a certain distance (e.g., half of the radiator length) to produce optimal azimuth beam patterns. For example, the first row 101 and second row 102 may be offset from the third row 103 and fourth row 104 in the azimuth direction by half the spacing between elements.

The interior or middle columns are primarily used for forming the two spotlight beams, and the outer or edge columns are shared elements for forming both the 65-degree coverage beams and the spotlight beams. According to some embodiments, the array may produce 2 65-degree coverage beams and 8 spotlight beams for each polarization. According to other embodiments, the array may produce 4 65-degree coverage beams and 16 spotlight beams for two linear polarizations.

Figure 2:
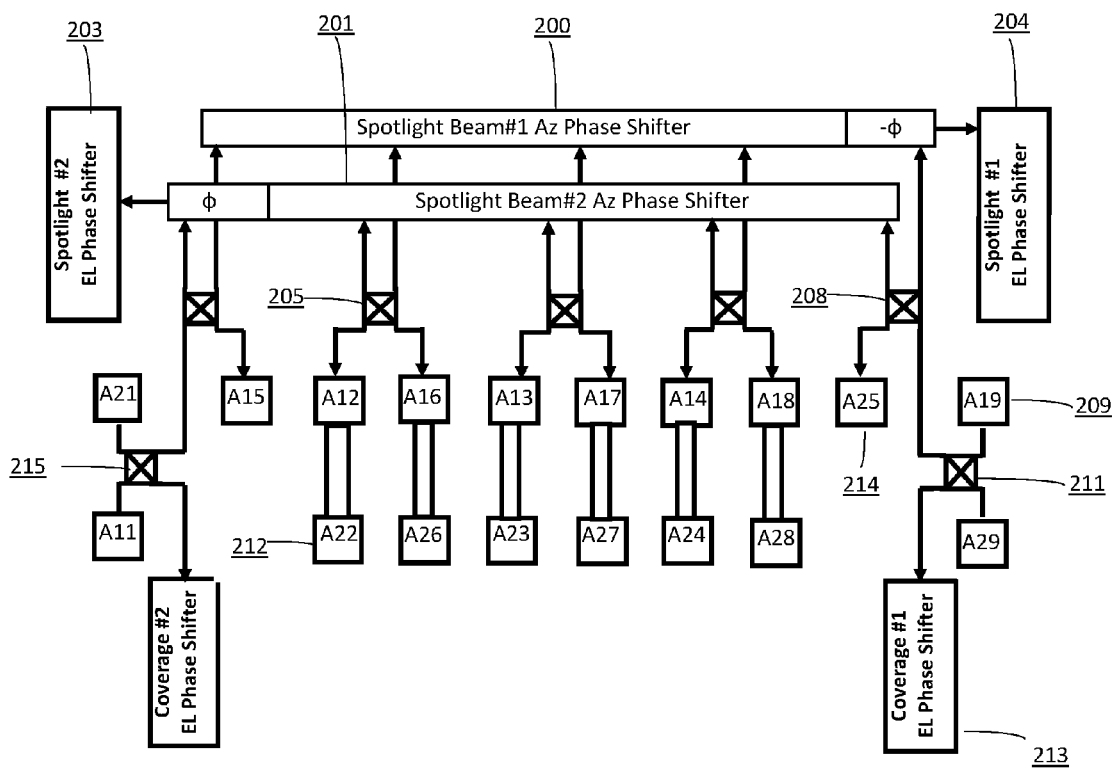
FIG. 2 is a block diagram illustrating an exemplary feed structure and beam forming configuration of a three-sector cellular MIMO array configuration with spotlight beams according to embodiments of the present disclosure.

With regard now to FIG. 2, an exemplary feed and beam forming structure of a three-sector MIMO configuration with two simultaneous spotlight beams is depicted according to embodiments of the present invention. The general arrangement and interconnections of the radiators is illustrated, where radiators are fed in pair to 90-degree hybrid couplers (e.g., hybrid coupler 205) at each interior column.

Outputs of the 90-degree hybrid couplers are summed at two separate azimuth phase shifters 201 and 200 to form spotlight beams, and radiators at the edge columns are used as shared elements for generating both spotlight beams and coverage beams. Azimuth phase shifter 200 is connected to elevation phase shifter 204, and azimuth phase shifter 201 is connected to elevation phase shifter 203. The radiators at the interior of the rows (e.g., radiator 212) are fed in pair to hybrid couplers which feed one output to azimuth phase shifter 201 and another output to azimuth phase shifter 200. According to some embodiments, the coverage beams formed are 65-degree coverage beams.

The hybrid outputs of the edge column radiators (e.g., radiators 209 and 210) are split between the spotlight beams and the coverage beams. For example, one of the hybrid outputs of the right-most column (e.g., hybrid coupler 211) feeds elevation phase shifter 213 to produce a first 65-degree coverage beam, and the other hybrid output of the right-most column feeds an azimuth phase shifter (e.g., azimuth phase shifter 200) in conjunction with an additional radiator (e.g., radiator 214) and hybrid coupler (e.g., hybrid coupler 208). Similarly, the hybrid output of the left-most column (e.g., hybrid coupler 215) feeds the second spotlight beam and the second coverage beam. Consequently, this array architecture may produce two independent spotlight beams and two independent 65-degree coverage beams within the same aperture for different polarizations.

Figure 3:
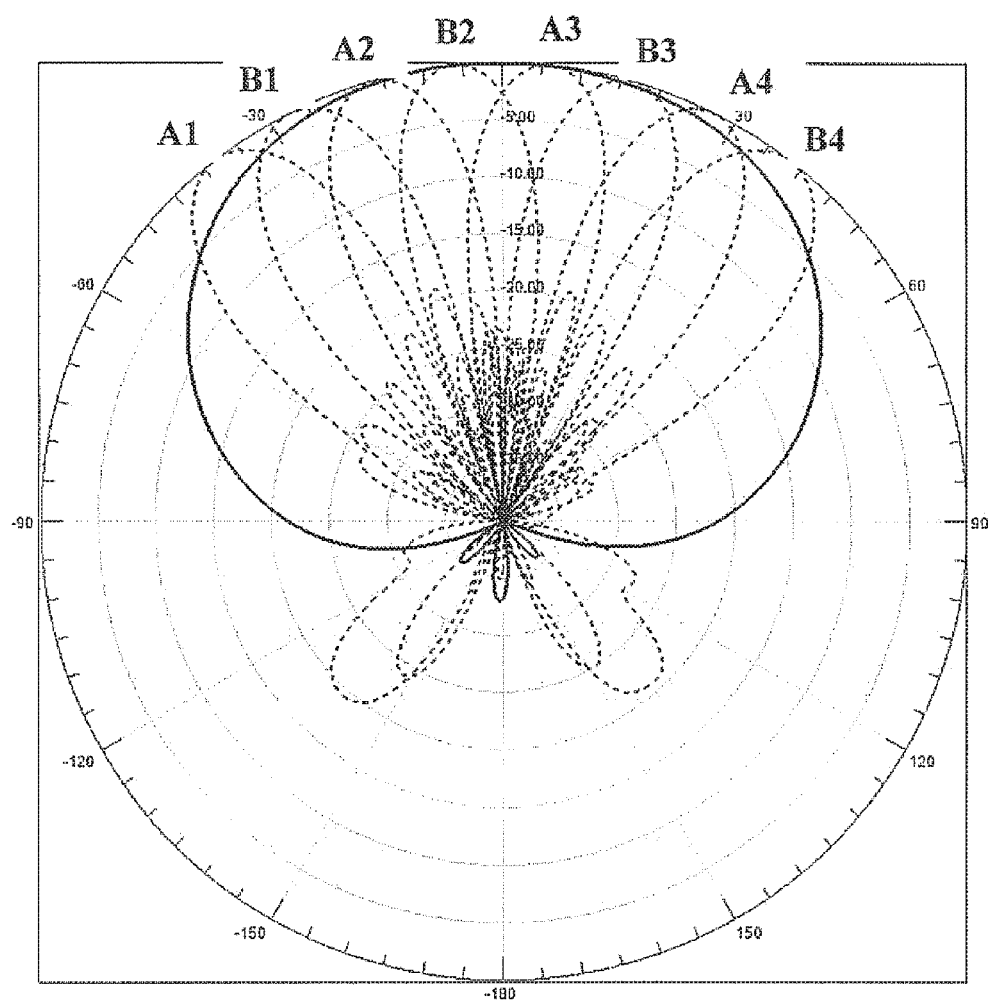
FIG. 3 is a diagram of radiation patterns of an exemplary three-sector cellular MIMO array with spotlight beams according to embodiments of the present disclosure.

FIG. 3 illustrates 65-degree coverage beam patterns and associated spotlight beam patterns for an exemplary broadband 3-sector MIMO array according to embodiments of the present invention. According to some embodiments, for each polarization, a narrow beam (e.g., 10° to 14°) is formed for each spotlight beam. In this case, a total of 8 spotlight beams are separated into two groups, with each group consisting of 4 alternating beams as shown in the figures. For example, at any given time, spotlight #1 can be A1, A2, A3, or A4 and Spotlight #2 can be B1, B2, B3, or B4. The frequency of operation typically include both the UMTS and LTE bands ranging from 1710 MHz to 2690 MHz. The beams are dual polarized with +/−45° linear slant polarization and can be used for 4T4R MIMO (>3λ spacing) or gain diversity.

Figure 4:
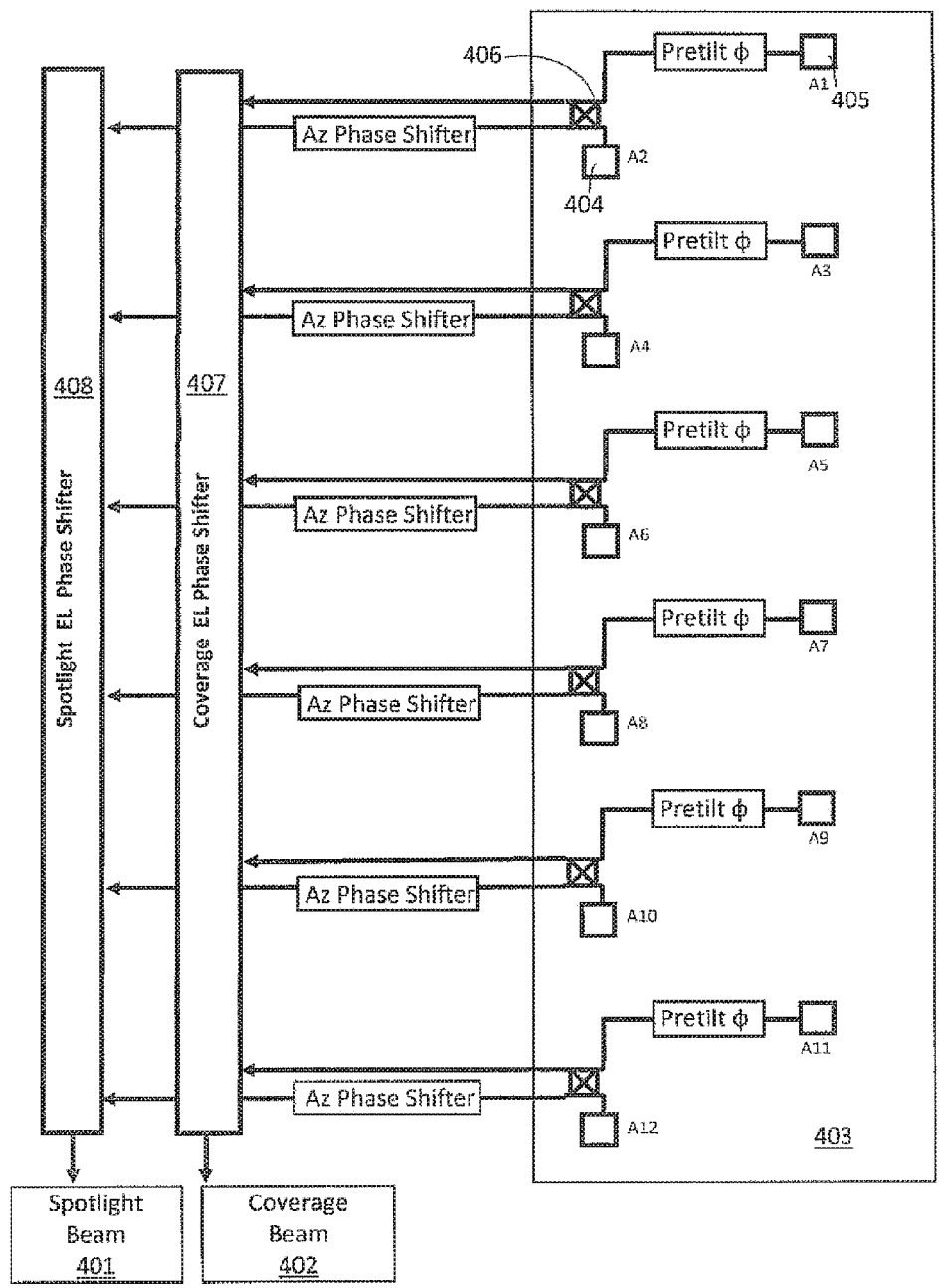
FIG. 4 is a block diagram of an exemplary orthogonal dual spotlight beam forming scheme according to embodiments of the present disclosure.

With regard now to FIG. 4, an exemplary orthogonal dual beam forming configuration for producing spotlight beams (e.g., spotlight beam 401) and coverage beams (e.g., coverage beam 402) is illustrated according to embodiments of the present invention. A single column (e.g., column 403) is illustrated, according to some embodiments. As described earlier, rows of beam forming elements are paired together, and pairs of radiators (e.g., radiators 404 and 405) are connected by a 90-degree hybrid coupler (e.g., hybrid 406). Each 0-degree output of the hybrid couplers are fed to a phase shifter (e.g., spotlight phase shifter 408), while each 90-degree output of the hybrids are fed to a coverage phase shifter (e.g., coverage phase shifter 407). As such, two orthogonal beams may be formed simultaneously.

Figure 5:
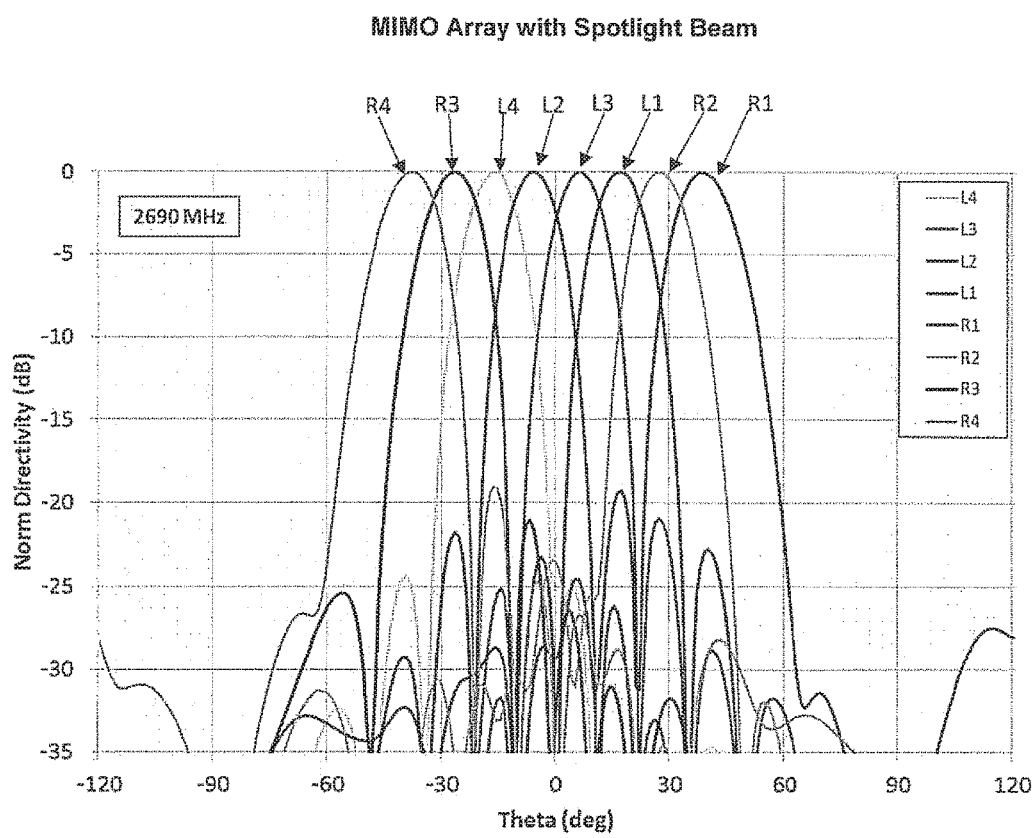
FIG. 5 is a graph illustrating an exemplary azimuth radiation pattern of a steerable spotlight beam according to embodiments of the present disclosure.

With regard now to FIG. 5, azimuth radiation patterns of exemplary steerable spotlight beams are illustrated according to embodiments of the present invention. The spotlight beams are orthogonal to each other, and the beamwidth of the beams depends on the azimuth size and number of columns in the array. In one planar configuration, the spotlight beam may be steered to approximately ±45° with relatively low azimuth sidelobes (e.g., below −18 dB). Unlike the radiation patterns produced by prior techniques, such as a Butler matrix with uniform weight function, the patterns have relatively low sidelobes due to flexible amplitude taper.

Figure 6:
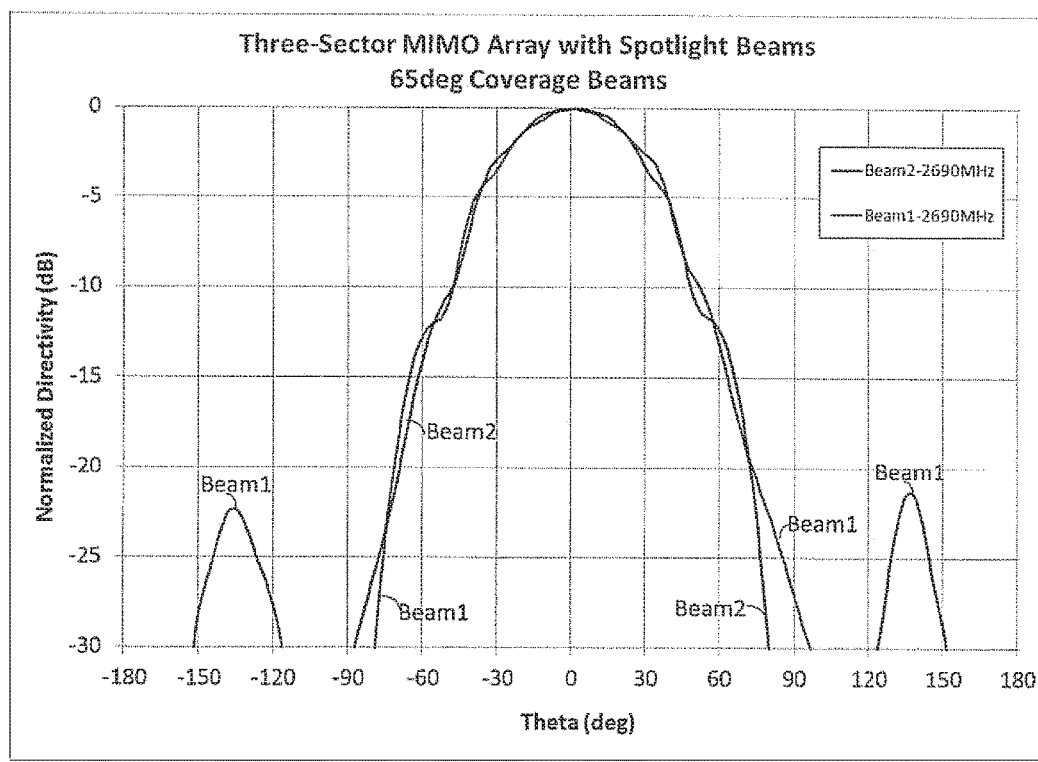
FIG. 6 is a graph illustrating exemplary azimuth radiation patterns of a 65° coverage beam according to embodiments of the present disclosure.

With regard to FIG. 6, azimuth radiation patterns of an exemplary 65-degree coverage beam produced by edge columns for a three-sector MIMO array is illustrated according to embodiments of the present invention.

What is claimed is:

1. A method of operating an antenna array having a plurality of rows of discrete radiators, the method comprising:
    generating first pairs of outputs using outputs from a plurality of the discrete radiators at an interior of the rows, wherein each pair of outputs comprises a first output and an orthogonal output orthogonal to the first output;
    azimuthally shifting the first outputs to produce first azimuthally-shifted outputs;
    azimuthally shifting the orthogonal outputs to produce second azimuthally-shifted outputs;
    generating a second pair of outputs orthogonal to each other using outputs from a plurality of the discrete radiators at a first end of the rows;
    generating a third pair of outputs orthogonal to each other using outputs from a plurality of the discrete radiators at a second end of the rows;
    elevationally shifting one of the second pair of outputs to produce a first coverage beam;
    elevationally shifting one of the third pair of outputs to produce a second coverage beam;
    elevationally shifting the first azimuthally-shifted outputs to produce a first steerable spotlight beam; and
    elevationally shifting the second azimuthally-shifted outputs to produce a second steerable spotlight beam.

2. The method of claim 1, further comprising simultaneously producing the first coverage beam, the second coverage beam, the first steerable spotlight beam and the second steerable spotlight beam.

3. The method of claim 1, further comprising using another of the second pair of outputs and another of the third pair of outputs in producing the first and second steerable spotlight beams.

4. The method of claim 1, further comprising using 90-degree hybrid couplers to generate the first, second and third pairs of outputs.

5. The method of claim 1, wherein gains of the first and second coverage beams are greater than gains of the first and second steerable spotlight beams.

6. The method of claim 1, wherein the first and second steerable spotlight beams are narrower than the first and second coverage beams.

7. The method of claim 1, further comprising operating the first and second coverage beams in a multiple input multiple output (MIMO) mode.

8. The method of claim 1, further comprising:
    electronically steering the first and second coverage beams in elevation, and
    electronically steering the first and second steerable spotlight beams in azimuth and elevation.

9. The method of claim 1, further comprising irradiating the first coverage beam, the second coverage beam, the first steerable spotlight beam and the second steerable spotlight beam from a common aperture.

10. The method of claim 1, further comprising generating six additional steerable spotlight beams.

11. A method of operating an antenna array having a plurality of rows of discrete radiators, the method comprising:
    feeding outputs from a plurality of the discrete radiators at an interior of the rows in pairs to first hybrid couplers;
    feeding a first output of each first hybrid coupler to a first azimuth phase shifter;
    feeding a second output of each first hybrid coupler to a second azimuth phase shifter;
    feeding outputs from a plurality of the discrete radiators at a first end of the rows to a second hybrid coupler;
    feeding outputs from a plurality of the discrete radiators at a second end of the rows to a third hybrid coupler;
    generating, by a first elevation phase shifter, a first coverage beam using an output of the second hybrid coupler;
    generating, by a second elevation phase shifter, a second coverage beam using an output of the third hybrid coupler;
    generating, by a third elevation phase shifter, a first steerable spotlight beam using an output of the first azimuth phase shifter; and
    generating, by a fourth elevation phase shifter, a second steerable spotlight beam using an output of the second azimuth phase shifter.

12. The method of claim 11, further comprising simultaneously generating the first coverage beam, the second coverage beam, the first steerable spotlight beam and the second steerable spotlight beam.

13. The method of claim 11, further comprising feeding second outputs from the plurality of the discrete radiators at the first end of the rows to the first and second azimuth phase shifters for use in generating the first and second steerable spotlight beams.

14. The method of claim 11, wherein the first, second and third hybrid couplers are 90-degree hybrid couplers.

15. The method of claim 11, wherein gains of the first and second coverage beams are greater than gains of the first and second steerable spotlight beams.

16. The method of claim 11, wherein the first and second steerable spotlight beams are narrower than the first and second coverage beams.

17. The method of claim 11, further comprising operating the first and second coverage beams in a multiple input multiple output (MIMO) mode.

18. The method of claim 11, further comprising:
   electronically steering the first and second coverage beams in elevation, and
   electronically steering the first and second steerable spotlight beams in azimuth and elevation.

19. The method of claim 11, further comprising irradiating the first coverage beam, the second coverage beam, the first steerable spotlight beam and the second steerable spotlight beam from a common aperture.

20. The method of claim 11, further comprising generating six additional steerable spotlight beams.

* * * * *